United States Patent
Ichikawa

(10) Patent No.: US 8,086,808 B2
(45) Date of Patent: Dec. 27, 2011

(54) METHOD AND SYSTEM FOR MIGRATION BETWEEN PHYSICAL AND VIRTUAL SYSTEMS

(75) Inventor: Naoko Ichikawa, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 432 days.

(21) Appl. No.: 12/428,696

(22) Filed: Apr. 23, 2009

(65) Prior Publication Data
US 2010/0274981 A1    Oct. 28, 2010

(51) Int. Cl.
G06F 13/00    (2006.01)
(52) U.S. Cl. ............. 711/162; 711/170; 711/E12.002; 711/E12.016
(58) Field of Classification Search .............. 711/161, 711/162, 170, 203, E12.002, E12.016
See application file for complete search history.

(56) References Cited

U.S. PATENT DOCUMENTS

| | | | |
|---|---|---|---|
| 7,039,662 B2 | 5/2006 | Kano et al. | |
| 7,434,218 B2 * | 10/2008 | Fries | 718/1 |
| 7,467,269 B2 * | 12/2008 | Zimoto et al. | 711/162 |
| 2008/0082777 A1 | 4/2008 | Sakaguchi et al. | |
| 2008/0091896 A1 * | 4/2008 | Usami | 711/162 |

* cited by examiner

Primary Examiner — VanThu Nguyen
(74) Attorney, Agent, or Firm — Mattingly & Malur, PC

(57) ABSTRACT

A method of migrating a computer system between a virtualized environment and a non-virtualized environment comprises configuring one or more storage volumes for a migration destination in a destination environment based on a migration request containing a backup requirement specifying one or more copy groups, each copy group including storage volumes that store data for at least one of a virtualized device and a non-virtualized device; converting and migrating data from a migration source in a source environment to the one or more configured storage volumes of the migration destination based on copy group information of the one or more copy groups, one of the source environment and the destination environment being a virtualized environment, and another of the source environment and the destination environment being a non-virtualized environment; and migrating backup unit/group information by replacing copy group information in the source environment with copy group information in the destination environment.

20 Claims, 23 Drawing Sheets

Volume Management Table 155

| Storage System ID | Logical Volume ID | Capacity | Host ID |
|---|---|---|---|
| 5100 | 00:01 | 100GB | Host 1 |
| 5100 | 00:02 | 100GB | Host 2 |
| 5100 | 00:03 | 200GB | Host A |
| 5100 | 00:04 | 200GB | Host B |
| 5100 | 00:05 | 200GB | Host C |

Copy Group Management Table 156

| Group ID | Source Storage ID | Source Volume ID | Target Storage ID | Target Volume ID |
|---|---|---|---|---|
| Grp_01 | 5100 | 00:01 | 5100 | 01:01 |
| | 5100 | 00:02 | 5100 | 01:02 |
| | 5100 | 00:03 | 5100 | 01:03 |
| Grp_02 | 5100 | 00:04 | 5100 | 01:04 |
| | 5100 | 00:05 | 5100 | 01:05 |

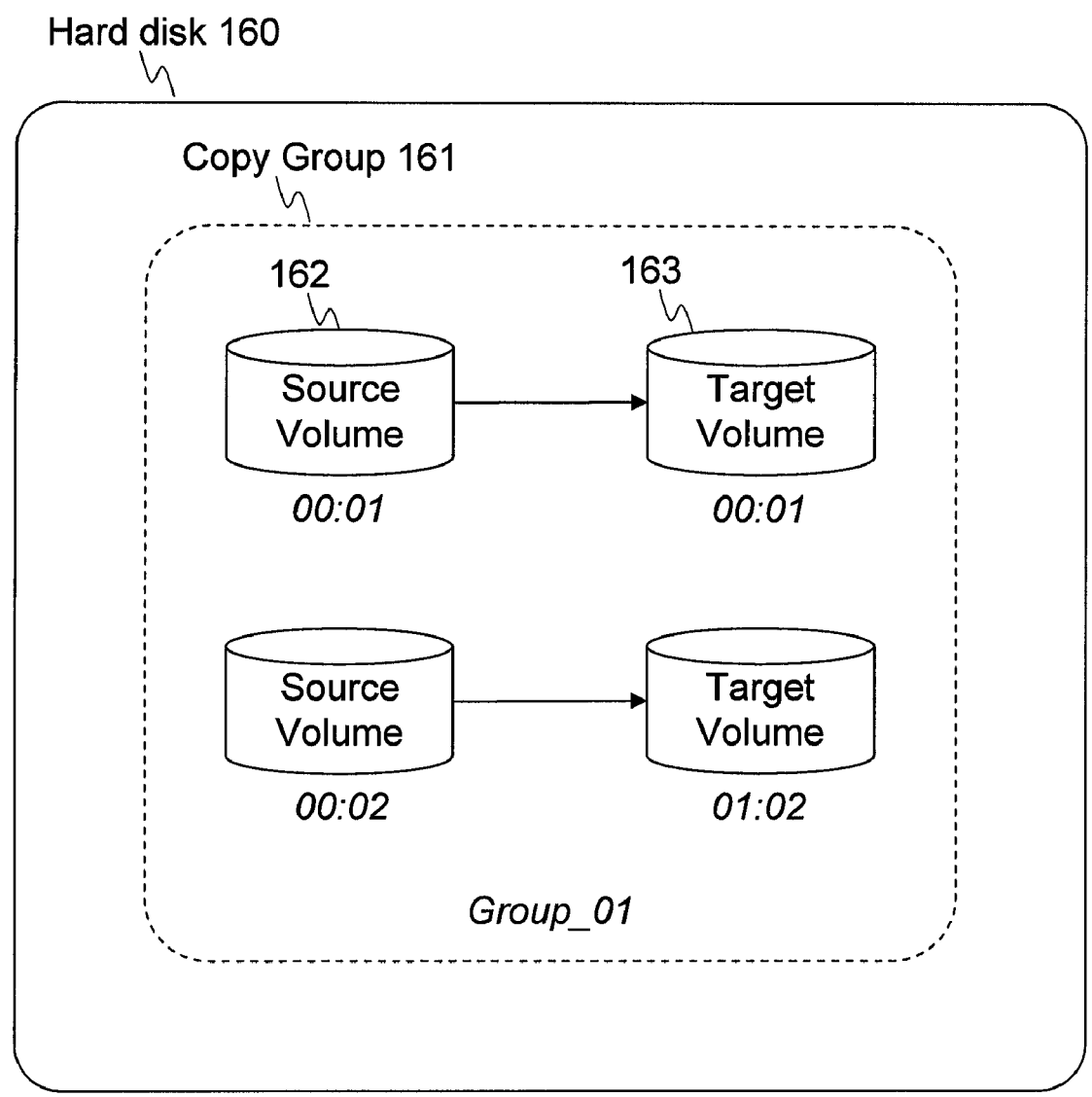
Fig. 5 Copy Group

Backup Management Table 655

| Schedule ID | Day | Time | Host ID | Group ID |
|---|---|---|---|---|
| DB1_Daily_Backup | Everyday | 17:00 | Host1, Host2 | Grp_01 |
| DB2_Daily_Backup | Everyday | 19:00 | HostA, HostB, HostC | Grp_02 |
| DB1_Weekly_Backup | Every Sunday | 8:00 | Host1, Host2 | Grp_01 |
| DB2_Weekly_Backup | Every Sunday | 10:00 | HostA, HostB, HostC | Grp_02 |

Fig. 8

Physical and Virtual Configuration Mapping Table 656

| Migration Date | Before Migration | | | | After Migration | | | |
|---|---|---|---|---|---|---|---|---|
| | P/V | Host ID | Disk Configuration | Storage Configuration | P/V | Host ID | Disk Configuration | Storage Configuration |
| 2009/02/02/ 00:00 | P | host1 | C:/ | Local Disk | V | host1 | C:/ | RAID1 FC LU |
| | P | host1 | D:/ | RAID1 FC LU | V | host1 | D:/ | |
| | P | host2 | C:/ | RAID5 FC LU | V | host2 | C:/ | |

156a Copy Group Management Table Before Migration

| Group ID | Source Storage ID | Source Volume ID | Target Storage ID | Target Volume ID |
|---|---|---|---|---|
| Grp_01 | 5100 | 00:01 | 5100 | 01:01 |
| | 5100 | 00:02 | 5100 | 01:02 |

156b Copy Group Management Table After Migration

| Group ID | Source Storage ID | Source Volume ID | Target Storage ID | Target Volume ID |
|---|---|---|---|---|
| Grp_01 | 5100 | 00:11 | 5100 | 01:11 |

US 8,086,808 B2

METHOD AND SYSTEM FOR MIGRATION BETWEEN PHYSICAL AND VIRTUAL SYSTEMS

BACKGROUND OF THE INVENTION

The present invention relates generally to storage systems and, more particularly, to migration of data and backup configuration between the virtualized system environment and the non-virtualized system environment.

Recently the server virtualization technology is increasingly introduced into IT systems in business enterprises. The server virtualization technology virtualizes a server computer by virtually splitting a set of computing resources (i.e., CPU, memory, storage, and other hardware devices) into multiple sets of computing resources so that it can run multiple operating systems and applications on one physical server. Each virtual computer that runs on the split resources is called a "virtual machine." This technology achieves physical server consolidation resulting in the reduction of server management costs. Another advantage of this technology is virtual machine portability. Because virtual machines can be stored as a set of files, virtual machines can be copied, moved or deleted easily. This property is efficient to construct a resilient and easy-to-manage system environment.

It is known that most business enterprises already have their own IT system environment. Therefore, most business enterprises can face a need to migrate from the non-virtualized system environment to the virtualized system environment. To migrate to the virtualized environment, the operating system and application data in the current non-virtualized environment should be converted appropriately to the virtual machine format. Some software venders already provide software tools to convert data between the non-virtualized environment and the virtualized environment. Examples of data conversion software tools include VMware Converter, System Center Virtual Machine Manager by Microsoft, PlateSpin PowerConvert by Novell, and Symantec Backup Exec System Recovery. Using the data conversion software tools, the operating system and application data are easily migrated to the virtualized environment. However, most management settings such as the backup management should be redesigned and reconfigured manually.

As an existing migration technology within the non-virtualized environment, U.S. Pat. No. 7,039,662 describes the migration technology in which the volume setting information relating to a data is migrated from the first setting volume to the second setting volume in the remote storage system, so that the host may access the data in the remote system. US2008/0082777 describes the migration technology in which the data storage destination is selected based on the performance characteristics of an application. Also, remote copy technology to keep data consistency and remote copy pair migration technology are disclosed in, for example, U.S. Pat. Nos. 6,859,824 and 7,330,948. The copy technology disclosed in these publications enables backup applications to designate a certain unit/group of storage volumes to be backed up at a time to either the local system or the remote system so as to keep data consistency at a corresponding point in time. This unit/group is defined in the storage system and its backup functionality such as data copy, snapshot, and replication takes backups of volumes defined as a member of the unit/group at a time. These references are incorporated herein by reference.

When migrating a system from the non-virtualized to the virtualized environment, not only data but also backup configuration should be migrated in order to continue consistent data protection. Because in the virtual environment, multiple computers can be run on one physical server and it often invokes a reduced number and a larger capacity of storage volumes, the unit/group configuration for consistent backup can be changed. For example, migration of two physical servers using one storage volume each (two volumes in total) in a single backup group can result in one physical volume shared by two virtual servers, and vice versa, when migrating from the virtualized to the non-virtualized environment. However, any of the conversion tools or current technology for data migration does not provide the system or method to migrate data with consideration of backup configuration between the virtual environment and the non-virtual environment. As a result, system administrators are required to redesign and reconfigure the storage volumes and backup environment on migration.

BRIEF SUMMARY OF THE INVENTION

Exemplary embodiments of the invention provide methods and apparatuses that enable system administrators to migrate computer system between the non-virtualized and the virtualized system environments without concern of redesigning and reconfiguring the storage and the backup environment. The storage volumes for migration destination are configured with consideration of the backup requirement, data are converted and migrated between the non-virtualized environment and the virtualized system environment, and the backup unit/group information is also migrated by updating the group information on the migration. In addition, the physical/logical storage configuration between before and after migration (equal between the virtualized and non-virtualized environments) is recorded and the storage configuration is restored when migrating back to virtualized or non-virtualized environment.

One aspect of the present invention is directed to a method of migrating a computer system between a virtualized environment and a non-virtualized environment. The method comprises configuring one or more storage volumes for a migration destination in a destination environment based on a migration request containing a backup requirement specifying one or more copy groups, each copy group including storage volumes that store data for at least one of a virtualized device and a non-virtualized device; converting and migrating data from a migration source in a source environment to the one or more configured storage volumes of the migration destination based on copy group information of the one or more copy groups, one of the source environment and the destination environment being a virtualized environment, and another of the source environment and the destination environment being a non-virtualized environment; and migrating backup unit/group information by replacing copy group information in the source environment with copy group information in the destination environment.

In some embodiments, the configuring comprises calculating a necessary capacity for the one or more storage volumes as one or more migration target volumes at the migration destination with regard to all devices at the migration source in each copy group specified in the migration request. The source environment is the non-virtualized environment and the destination environment is the virtualized environment. The calculating comprises calculating a total capacity based on all non-virtualized devices at the migration source in each copy group to be used to create a new storage volume for a virtualized device at the migration destination. Calculating the total capacity comprises calculating one of (1) sum of all disk capacities used for all non-virtualized devices in each copy group at the migration source; (2) sum of all disk capacities used for all non-virtualized devices in each copy group at the migration source plus a margin; (3) sum of all disk capacities used for all non-virtualized devices in each copy group at the migration source multiplied by a margin rate; or (4) sum of all disk capacities within an operating system multiplied by an operating system-specific capacity conversion ratio at the migration source.

In specific embodiments, the source environment is the virtualized environment and the destination environment is the non-virtualized environment. Each copy group has at least one of virtualized host devices or virtual machines as virtualized devices at the migration source. The configuring comprises obtaining disk information from all of the virtualized devices in each copy group at the migration source in the virtualized environment; for each copy group, if there is a migration log for the virtualized devices in the copy group at the migration source, determining a volume configuration for the one or more migration target volumes at the migration destination based on a volume configuration in the migration log and calculating a total capacity based on all virtualized devices in the copy group at the migration source; and for each copy group, if there is not a migration log for the virtualized devices at the migration source, determining a volume configuration for the one or more migration target volumes at the migration destination based on one of (1) one volume for each device in the copy group at the migration destination including an operating system and system partitions or disks, or (2) system partitions or disks to be stored in a direct-attached storage system and data partitions to be stored in volumes in the storage system at the migration destination, and calculating a total capacity based on all virtualized devices in the copy group at the migration source. Calculating a total capacity based on all virtualized devices in the copy group at the migration source comprises calculating one of (1) sum of an intended disk capacity used by each virtualized device in the copy group at the migration source; (2) sum of an intended disk capacity used by each virtualized device in the copy group at the migration source plus a margin for each migration target volume; or (3) sum of an intended disk capacity used by each virtualized device in the copy group at the migration source multiplied by a margin rate for each migration target volume.

In some embodiments, replacing copy group information in the source environment with copy group information in the destination environment includes keeping the same group identification for each copy group.

Another aspect of the invention is directed to a system of migrating a computer system between a virtualized environment and a non-virtualized environment. The system comprises one or more virtualized devices in a virtualized environment; one or more non-virtualized devices in a non-virtualized environment; a storage system having a plurality of storage volumes; and a network connecting the one or more virtualized devices, the one or more non-virtualized devices, and the storage system. The system further comprises a migration module which configures one or more storage volumes at a migration destination in a destination environment based on a migration request containing a backup requirement specifying one or more copy groups, each copy group including storage volumes that store data for at least one of a virtualized device and a non-virtualized device; converts and migrates data from a migration source in a source environment to the one or more configured storage volumes of the migration destination; and migrates backup unit/group information by replacing copy group information in the source environment with copy group information in the destination environment. Each copy group includes at least one of the virtualized device or the non-virtualized device. One of the source environment and the destination environment is the virtualized environment, and another of the source environment and the destination environment is the non-virtualized environment.

In some embodiments, a management computer connected to the network, and the migration module is in the management computer. In other embodiments, the migration module is in one or more of the virtualized device or the non-virtualized device.

Another aspect of the invention is directed to a computer-readable storage medium storing a plurality of instructions for controlling a data processor to migrate a computer system between a virtualized environment and a non-virtualized environment. The plurality of instructions comprise instructions that cause the data processor to configure one or more storage volumes for a migration destination in a destination environment based on a migration request containing a backup requirement specifying one or more copy groups, wherein each copy group includes storage volumes that store data for at least one of a virtualized device and a non-virtualized device; instructions that cause the data process or to convert and migrate data from a migration source in a source environment to the one or more configured storage volumes of the migration destination, one of the source environment and the destination environment being a virtualized environment, and another of the source environment and the destination environment being a non-virtualized environment; and instructions that cause the data processor to migrate backup unit/group information by replacing copy group information in the source environment with copy group information in the destination environment.

These and other features and advantages of the present invention will become apparent to those of ordinary skill in the art in view of the following detailed description of the specific embodiments.

BRIEF DESCRIPTION OF THE DRAWINGS

FIG. 3 shows an example of the volume management table.

FIG. 4 shows an example of the copy group management table 156.

FIG. 5 shows an example of a copy group.

FIG. 8 shows an example of the backup management table.

FIG. 9 shows an example of the physical and virtual mapping table.

DETAILED DESCRIPTION OF THE INVENTION

Figure 1:
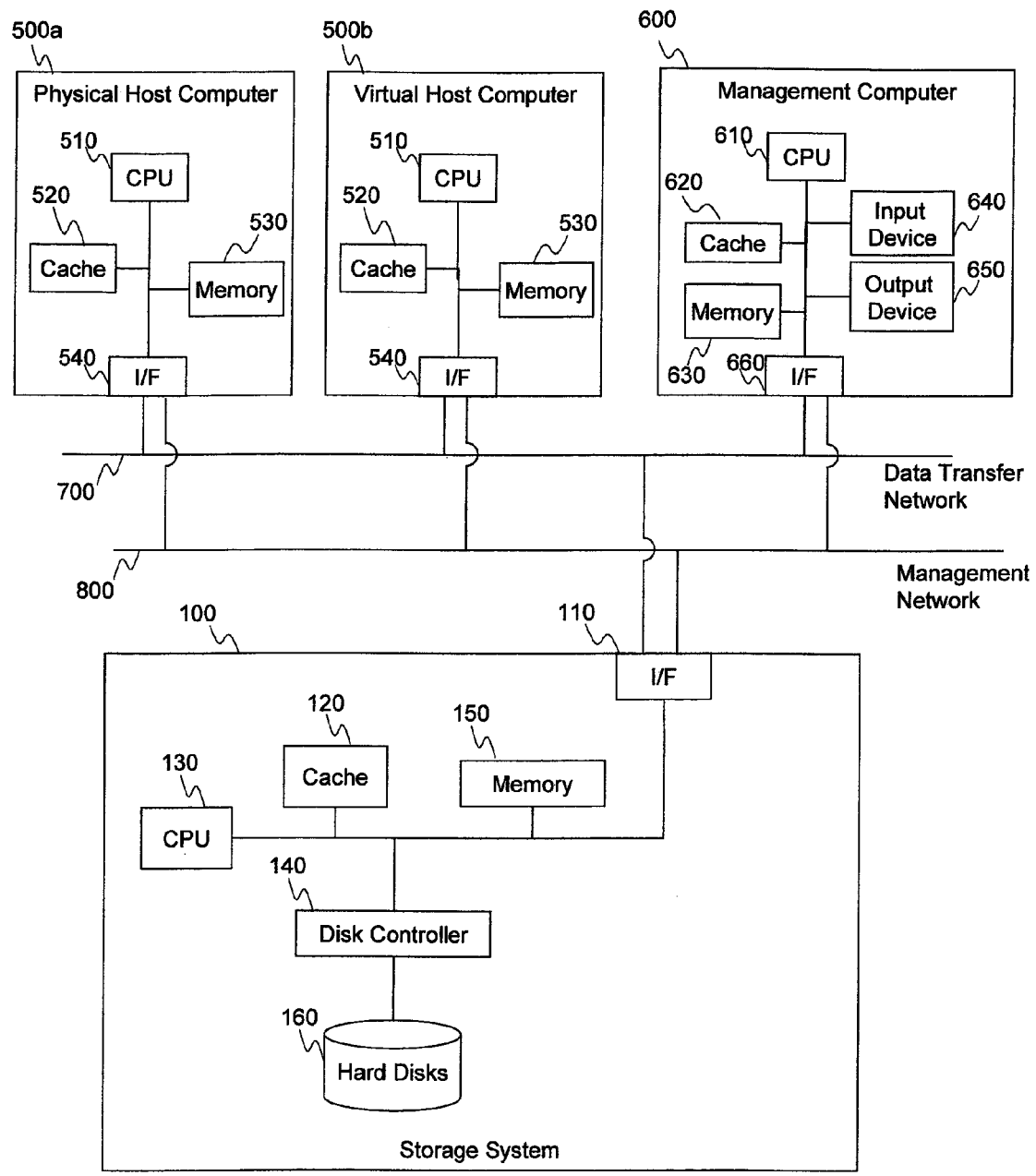
FIG. 1 illustrates an example of a hardware configuration in which the method and apparatus of the invention may be applied.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment", "this embodiment", or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing", "computing", "calculating", "determining", "displaying", or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for migrating computer system between the non-virtualized and the virtualized system environments without concern of redesigning and reconfiguring the storage and the backup environment. As used herein, a "virtualized device" is a device in the virtualized system environment, including a virtual machine, a virtual host device, or the like. As used herein, a "non-virtualized device" is a device in the non-virtualized system environment, including a hard disk, a logical device, or the like.

First Embodiment

In the first embodiment, a computer system and a method in which data and backup configuration in a storage system is migrated from a non-virtualized environment to a virtualized environment is disclosed. When one or more physical host computers store data in storage volumes within the storage system and one or more of the storage volumes are defined as members of the same copy group, backup operation for these volumes are executed on a copy group basis. This kind of backup functionality is currently used as it is advantageous when data consistency is required among a plurality of storage volumes. Although the backup functionality in this disclosure is hereinafter represented as the data copy functionality, it is not limited to that particular example, but any other types of functionality such as snapshot and replication are within the scope of this invention. Generally, the migration of data between the physical and the virtual environments accompanies reconfiguring volumes and backup settings. Utilizing this invention, administrators will be able to operate backup operations without the change of backup configuration even after the migration.

1. System Structure

FIG. 1 illustrates an example of a hardware configuration in which the method and apparatus of the invention may be applied. The computer system includes a storage system 100, a physical host computer 500a, a virtual host computer 500b, and a management computer 600 connected via a data transfer network 700 and a management network 800.

The storage system 100 includes an interface 110 to transfer data to/from the data transfer network 700 (e.g., an Ethernet network interface and/or a FC network interface), a cache 120 to store temporary data, a memory 150 for storing programs and tables, a CPU 130 that calls the programs and tables stored in the memory 150 and executes the programs, and a disk controller 140 for controlling hard disks 160. A plurality of hard disks can configure a RAID configuration for its redundancy. The group of hard disks for a single RAID configuration is called a "parity group" and an identification number is assigned to each parity group. These groups of hard disks are used as logically separate volumes, referred to as "logical volumes." In this disclosure, programs are executed by CPUs.

The computer system includes one or more physical host computers 500a and one or more virtual host computers 500b. The physical host computer 500a hosts the operating system and application services in the physical (non-virtualized) environment while the virtual host computer 500b hosts the server virtualization program and virtual machines. These hosts can be generic computers that include at least the following components: a CPU 510 that controls the host computer, a cache 520 for storing temporary data, a memory 530 for storing programs and tables read and used by the CPU 510 to manage the host computer, and an interface 540 that transmits data from/to networks. The interface 540 typically includes an interface for the Ethernet network interface and a FC network interface. These components may be the same as those in general computers.

The computer system includes one or more management computers 600. It may be a generic computer that includes at least the following components: a CPU 610 for controlling the management computer, a cache 620 for storing temporary data, a memory 630 for storing programs and tables read and used by the CPU 610 to manage the management computer, an input device 640 (e.g., a keyboard, a mouse, or the like), an output device 650 (e.g., an LCD or the like), and an interface 660 that transmits data from/to networks. The interface 660 typically includes an interface for the Ethernet network interface and a FC network interface. These components may be the same as those in general computers. It is also possible that the management computer 600 can be deployed as one of the virtual machines hosted by the virtual host computer 500b.

The data transfer network 700 is a network used to transfer data between the physical host computer 500a, the virtual host computer 500b, and the storage system 100. For example, transaction data created by users on either host computer is transferred via the data transfer network 700 to the storage system 100 in order to store the data. This network can be constituted with either FC or Ethernet.

The management network 800 is a network used to transfer management information regarding the computer system. The physical host computer 500a, the virtual host computer 500b, and the storage system 100 transmit and receive the management information mutually via the management network 800. This network can be either designated an LAN or a shared network with the data transfer network 700.

Figure 2:
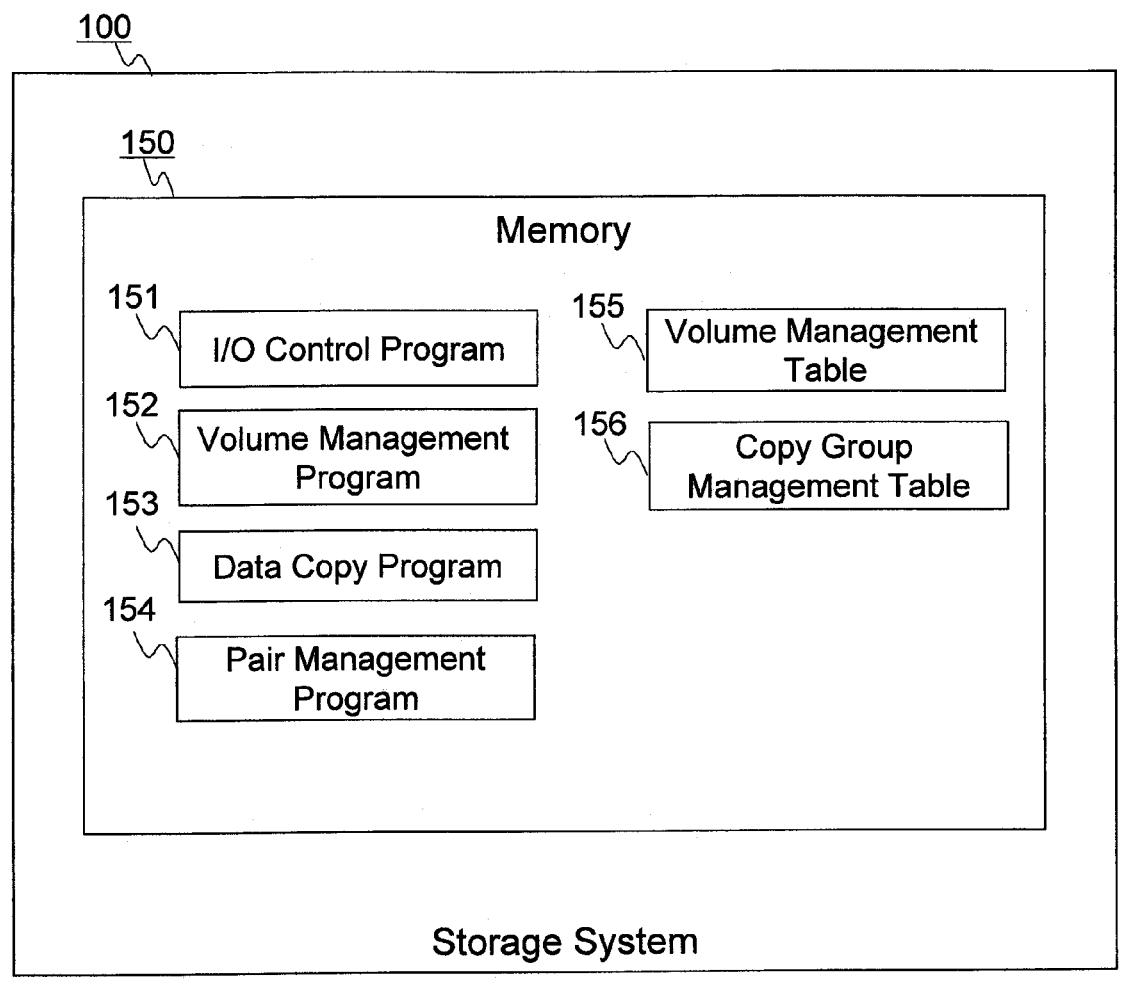
FIG. 2 shows an example of the programs and tables stored in the memory of the storage system.

FIG. 2 shows an example of the programs and tables stored in the memory 150 of the storage system 100. The I/O control program 151 is for I/O control in the storage system 100. The volume management program 152 creates or deletes logical volumes in the storage system 100 on request and updates the volume management table 155. The volume creation process is described below. The data copy program 153 copies data from the source volumes to the destination volumes based on copy group information defined by the copy group management table 156. This program may be able to keep the consistency of data (i.e., keep the order of write operation as it is written by the application), manage the differential status between the source volume and destination volume, or the incremental status between the two. The detailed copy operation is described below. The pair management program 154 manages pair configuration by requesting copy destination volume creation, updating the copy group management table 156, and transferring information of the table to the management computer 600 as needed.

FIG. 3 shows an example of the volume management table 155. It contains information of volumes within the storage system 100 to manage its volume configuration. The volume management table 155 contains at least the storage system ID 1550, logical volume ID 1551, capacity information 1552, and host ID 1553 of the host accessing the volume. It may also contain other information such as disk controller ID, parity group ID depending on the system property, and the like.

FIG. 4 shows an example of the copy group management table 156. It contains information of the copy pair within the storage system 100 to manage its copy pair configuration. The copy group management table 156 contains at least the group ID 1560, source storage ID 1561, source volume ID 1562, target storage ID 1563, and target volume ID 1564.

FIG. 5 shows an example of a copy group. Each barrel-shaped object in FIG. 5 represents a logical volume comprised of one or more hard disks 160. The source volumes 162 store production data to be copied by the data copy program 153 to the target volumes 163. The copy group includes one or more source and target volumes and the copy operation is executed on the copy group basis.

Figure 6A:
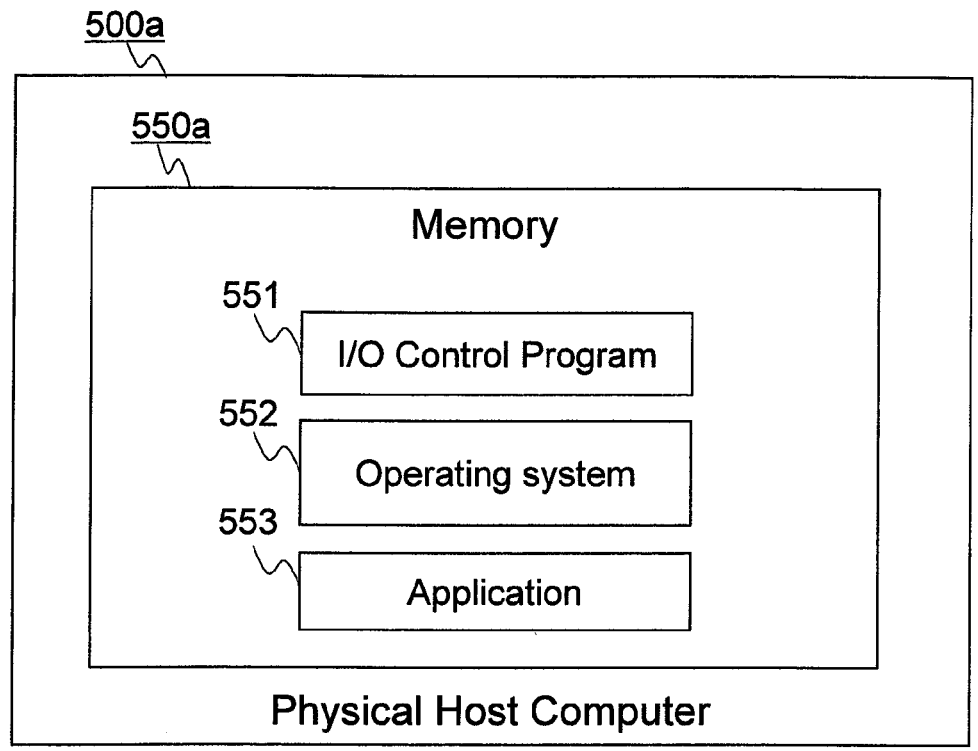
FIGS. 6a and 6b show an example of programs and tables stored in the memory of the physical host computer and the memory of the virtual host computer, respectively.
Figure 6B:
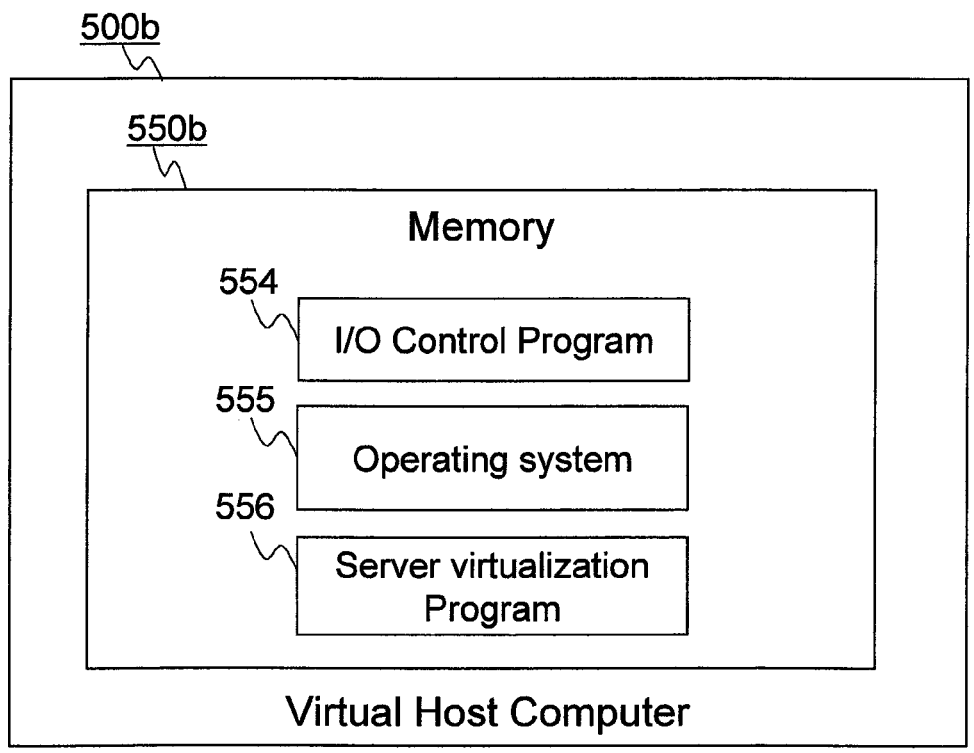

FIGS. 6a and 6b show an example of programs and tables stored in the memory 550a of the physical host computer 500a and the memory 550b of the virtual host computer 500b, respectively. In the memory 550a of the physical host computer 500a, at least the following items are stored. An I/O control program 551 is for I/O control in the physical host computer 500a. An operating system 552 may be a general operating system software. An application 553 has one or more applications programs executed on the physical host computer 500a. In the memory 550b of the virtual host computer 500b, at least the following items are stored. An I/O control program 554 is for I/O control in the virtual host computer 500b that supports the server virtualization program. An operating system 555 may be a general operating system software that supports the server virtualization program. A server virtualization program 556 enables server virtualization, hosts virtual machines, and manages virtual I/O between virtual machines and hardware devices. The server virtualization program 556 is also able to create and delete virtual machines.

Figure 7:
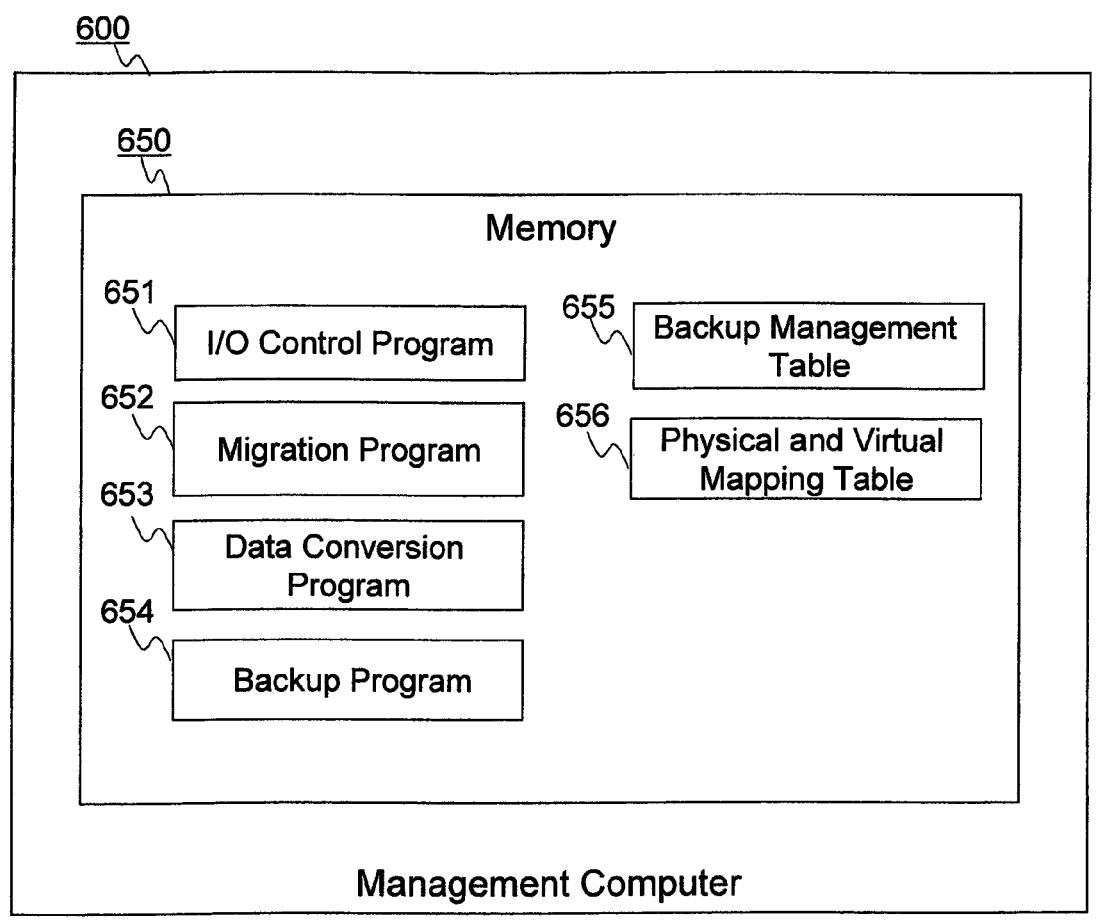
FIG. 7 shows an example of the programs and tables stored in the memory of the management computer.

FIG. 7 shows an example of the programs and tables stored in the memory 650 of the management computer 600. An I/O control program 651 is for I/O control in the management computer 600. A migration program 652 receives migration requests from the administrator and processes the necessary steps. The detailed process is described below. A data conversion program 653 converts data from that for the physical environment to that for the virtual environment, and vice versa. This program acquires data from the source environment and converts them as required and transfers the converted data to target data storage. The detailed copy operation is described below. A backup program 654 manages and executes a backup process as required. This program can be a generic backup software as long as it provides the following functions: executing a backup process utilizing the copy program within the storage system, and being able to designate the copy group in the storage system when taking backup. The memory 650 stores the backup management table 655 and the physical and virtual mapping table 656.

FIG. 8 shows an example of the backup management table 655. It manages the necessary information for backup execution. The backup program 654 executes a backup process based on this table. It contains at least the schedule ID 6550, day of the week 6551, time 6552, member host ID 6553, and group ID 6554. The group ID 6554 corresponds to that in the copy group management table 156 and is used to specify a group to be backed up. The host ID 6553 can be any identifier such as the host name, IP address, and port WWN.

FIG. 9 shows an example of the physical and virtual mapping table 656. It manages information of migration log and mapping information between the physical environment and the virtual environment. This table contains at least the migration date 6560, before migration information of physical (P) or virtual (V) status 6561, host ID 6562, disk configuration 6563 seen within the operation system, and storage configuration 6564, and after migration information of physical (P) or virtual (V) status 6565, host ID 6566, disk configuration 6567 seen within the operation system, and storage configuration 6568. The disk configuration can be either the drive identifier or mount-point information.

2. Process Flows

Figure 10:
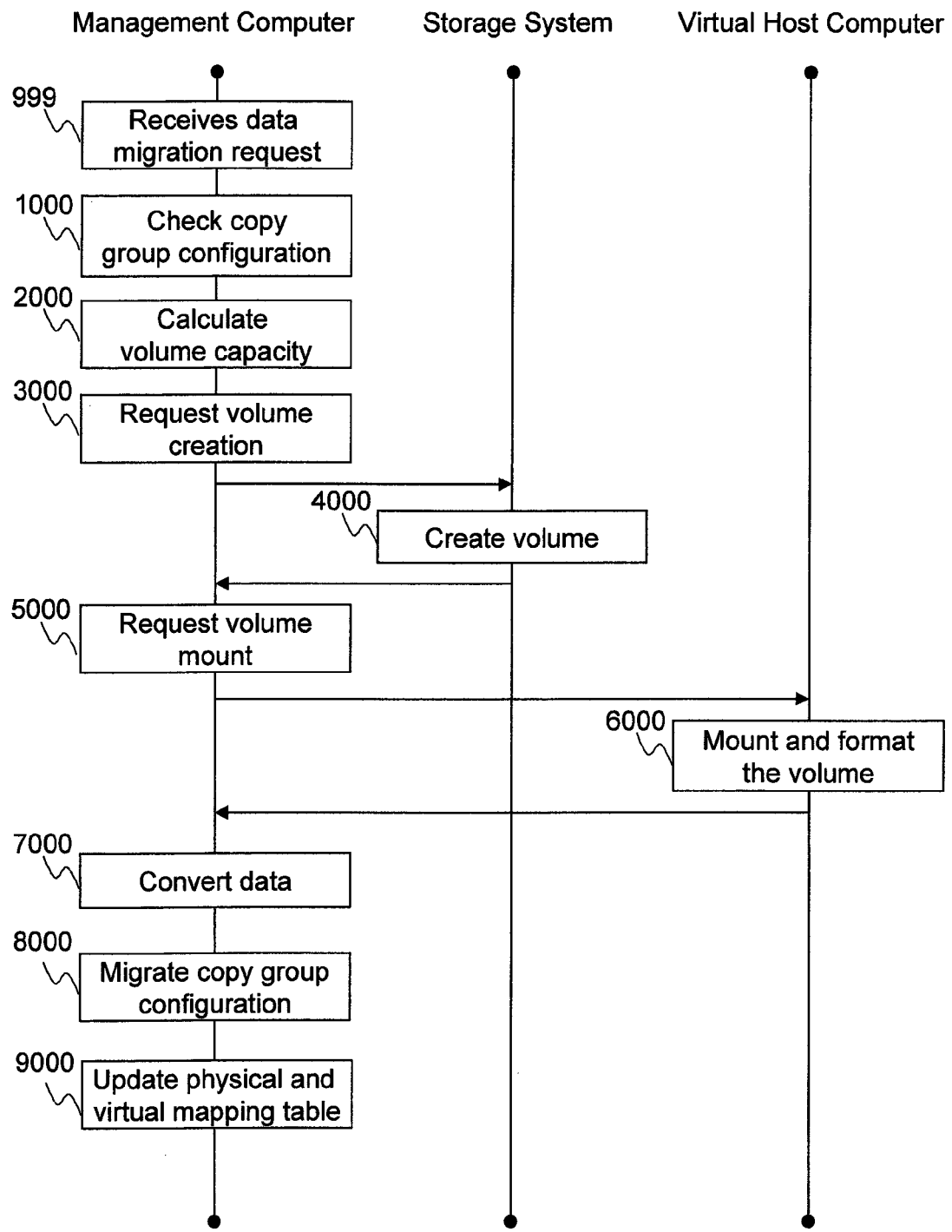
FIG. 10 shows an example of an overall process flow to migrate both data and backup configuration, from the physical to the virtual environment according to a first embodiment of the invention.

FIG. 10 shows an example of an overall process flow to migrate both data and backup configuration, from the physical to the virtual environment according to the first embodiment of the invention. The management computer 600 receives a data migration request from the administrator (step 999). The migration program 652 is executed and it checks the copy configuration regarding the copy group specified in the request by acquiring copy configuration information from the storage system 100 (step 1000). The migration program 652 calculates the necessary capacity as the migration target volume with regard to all hosts in the subject copy group (step 2000). The capacity calculation process is explained later with FIG. 11. The migration program 652 sends a volume creation request to the storage system 100 based on the calculated capacity (step 3000).

The storage system 100 creates volumes with the requested capacity (step 4000). In this step, both source and target volumes may be created if necessary. The volume creation process is explained later with FIG. 12. After receiving volume creation completion, the migration program 152 requests the virtual host computer to mount the created volume (step 5000). The operating system 555 in the virtual host computer 500b mounts and formats the specified source volume (step 6000). It may involve creating new virtual machine (s) and mounting the specified source volume to the virtual machine(s) if necessary.

The data conversion program 653 converts the physical data to virtual machine data and store the converted data in the created volume (step 7000). The data conversion process is explained later with FIG. 13. Next, the migration program 652 migrates the copy group configuration by requesting the copy management program 154 in storage system 100 to configure the copy group configuration and update the copy group management table (step 8000). This process is explained later with FIGS. 14 and 15. The migration program 652 in the management computer 600 updates the physical and virtual mapping table 656 (step 9000).

Figure 11:
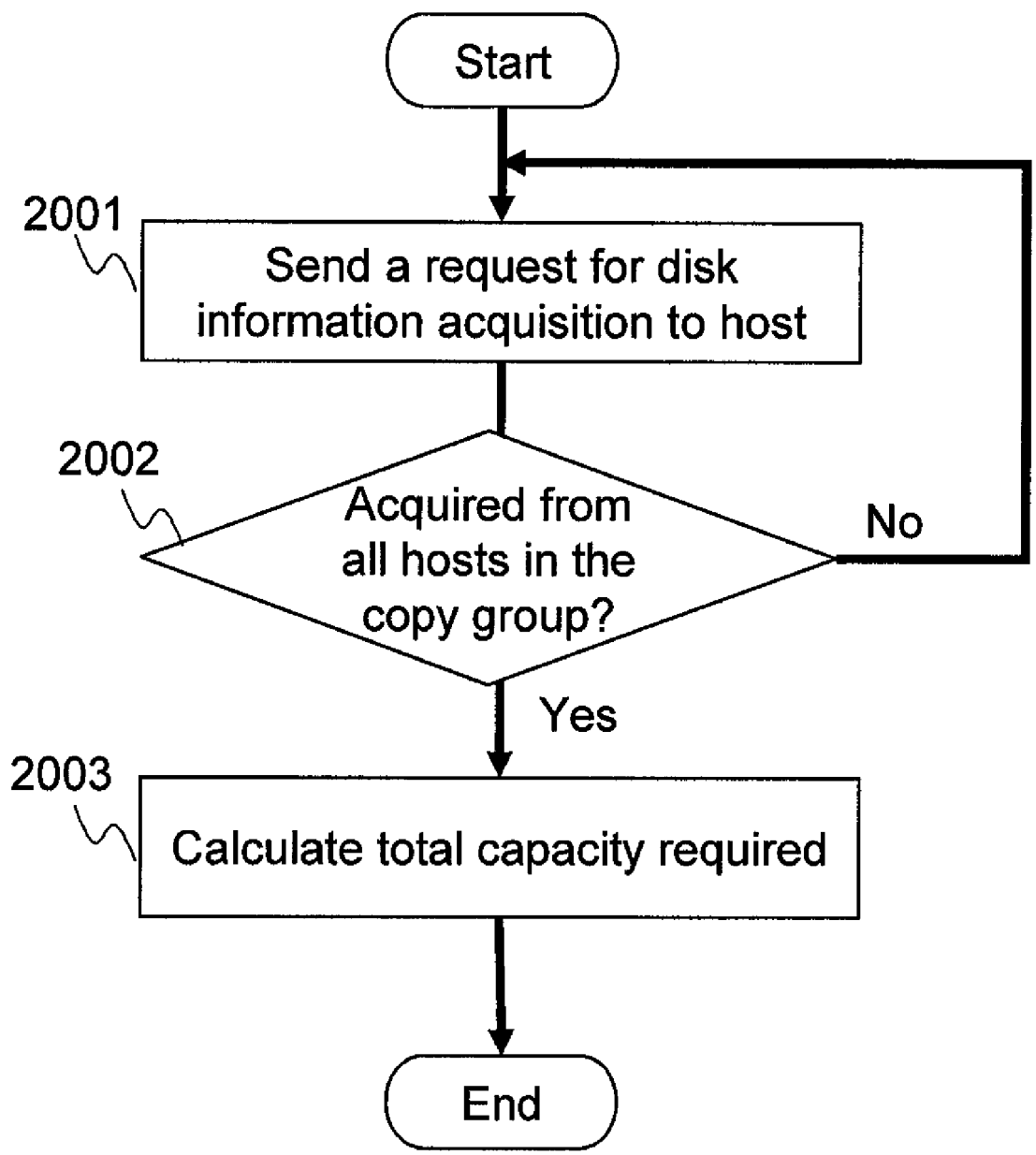
FIG. 11 shows an example of the process flow of capacity calculation executed with the migration program in the management computer according to the first embodiment.

FIG. 11 shows an example of the process flow of capacity calculation executed with the migration program 652 in the management computer 600. The migration program 652 sends a request to acquire disk information to the physical host computer 500a (step 2001). In this step, the disk management information including disk configuration and each capacity is acquired. If the migration program 652 has acquired from all physical host computers in the copy group specified in the migration request (Yes at step 2002), then it calculates the total capacity required for the new volume to be created for the virtual host computer 500b (step 2003). It is assumed that all data of physical hosts in a copy group are to be consolidated and stored in one volume unless the administrator makes a request otherwise. The calculation method can be any of the following:

(1) Sum of all disk capacities used, for all hosts within the copy group;
(2) Result of (1), plus a certain margin;
(3) Result of (1), multiplied by a certain margin rate;
(4) Sum of all disk capacities within an operating system multiplied by an operating system-specific capacity conversion ratio; Σ (Σ disk capacity in OS) (OS-specific conversion ratio).

If the migration program 652 has not acquired from all physical host computers in the copy group (No at step 2002), it goes back to step 2001. It is also possible that the converted data is stored in the existing volume to share it with existing virtual machines. In this case, the administrator can request to do so via the management window as explained below with FIG. 17. It is another possibility that the administrator may want to create multiple volumes to store the virtual machines still keeping in the same copy group. In that case, the administrator can request to do so via the management window as explained below with FIG. 18.

Figure 12:
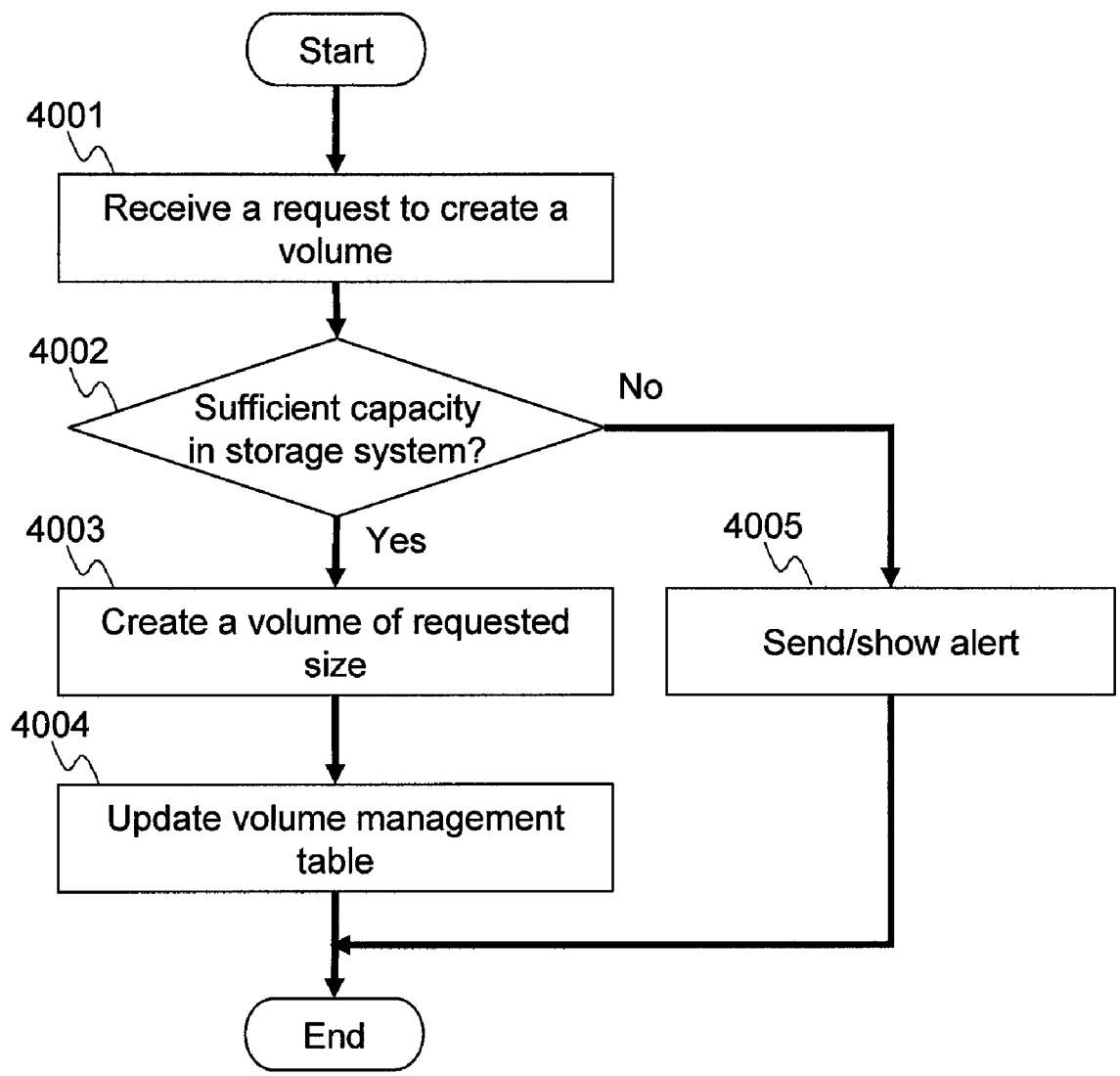
FIG. 12 shows an example of the volume creation process flow executed with the volume management program in the storage system.

FIG. 12 shows an example of the volume creation process flow executed with the volume management program 152 in the storage system 100. The storage system 100 receives a volume creation request from the administrator and it is transferred to the volume management program 152 (step 4001). This command contains at least volume capacity information. The volume capacity information is either input from the administrator or automated recognition by the golden image data size. The volume management program 152 searches available capacity in the storage. If the storage has available disks or parity groups that satisfy the capacity demand (Yes at step 4002), the volume management program 152 creates a volume with the capacity (step 4003). It updates the volume management table 155 (step 4004). If the storage does not have available disks or parity groups that satisfy the capacity demand (No at step 4002), the volume management program 152 returns an error message (step 4005). The error message can include a suggestion for users to add a particular amount of capacity or a particular number of disks.

Figure 13:
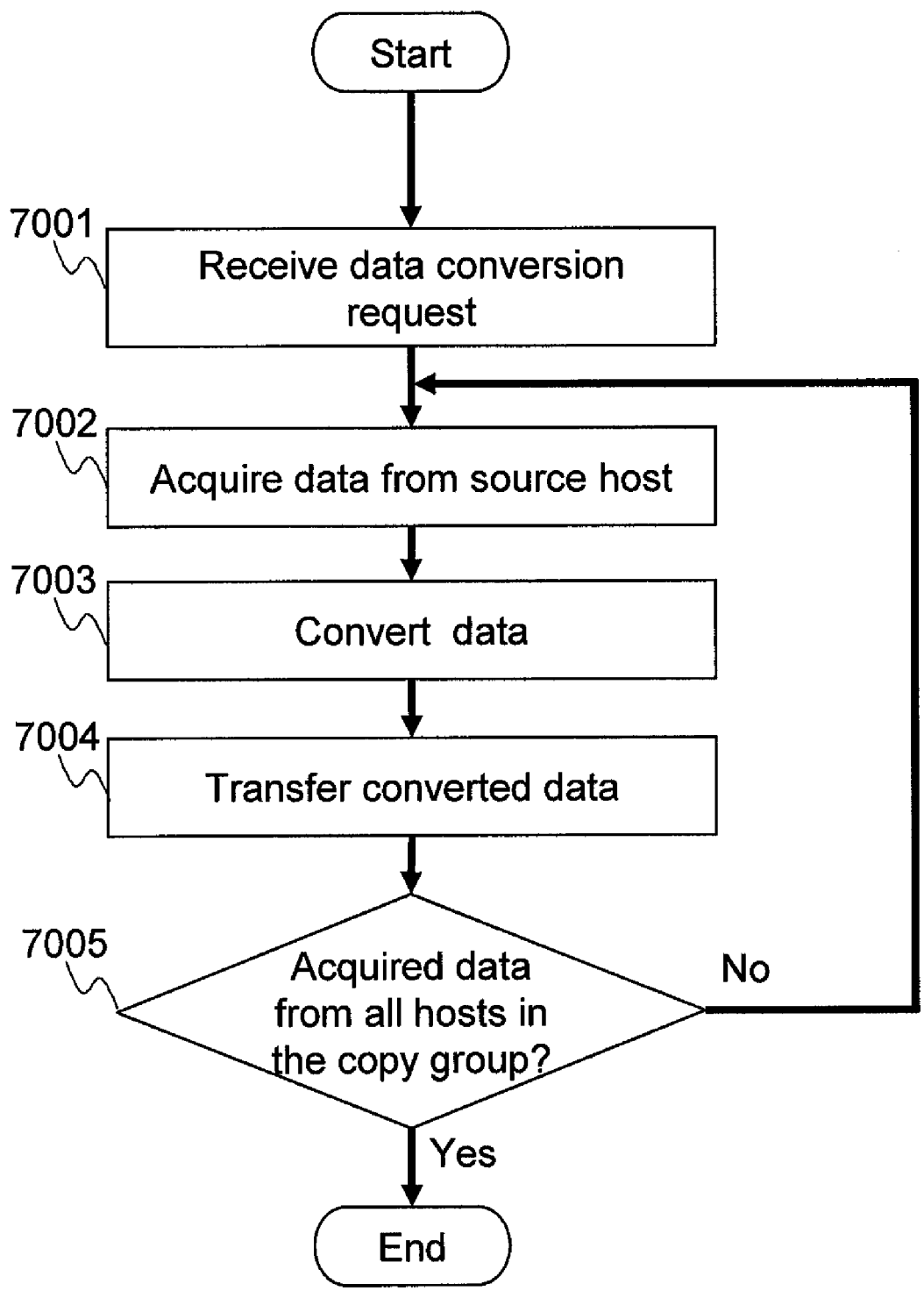
FIG. 13 shows an example of the data conversion process flow executed with the data conversion program in the management computer.

FIG. 13 shows an example of the data conversion process flow executed with the data conversion program 653 in the management computer 600. This process can be provided by any of the general software for P to V conversion. After receiving a data conversion request (step 7001), the data conversion program 653 accesses the source host computer specified in the request, and acquires data from the source (step 7002). The data conversion program 653 converts the acquired data to virtual machine format (step 7003) and stores the data in the volume (step 7004). If the data conversion program 653 has not acquired data from all physical host computers in the copy group (No at step 7005), it goes back to step 7002.

Figure 14:
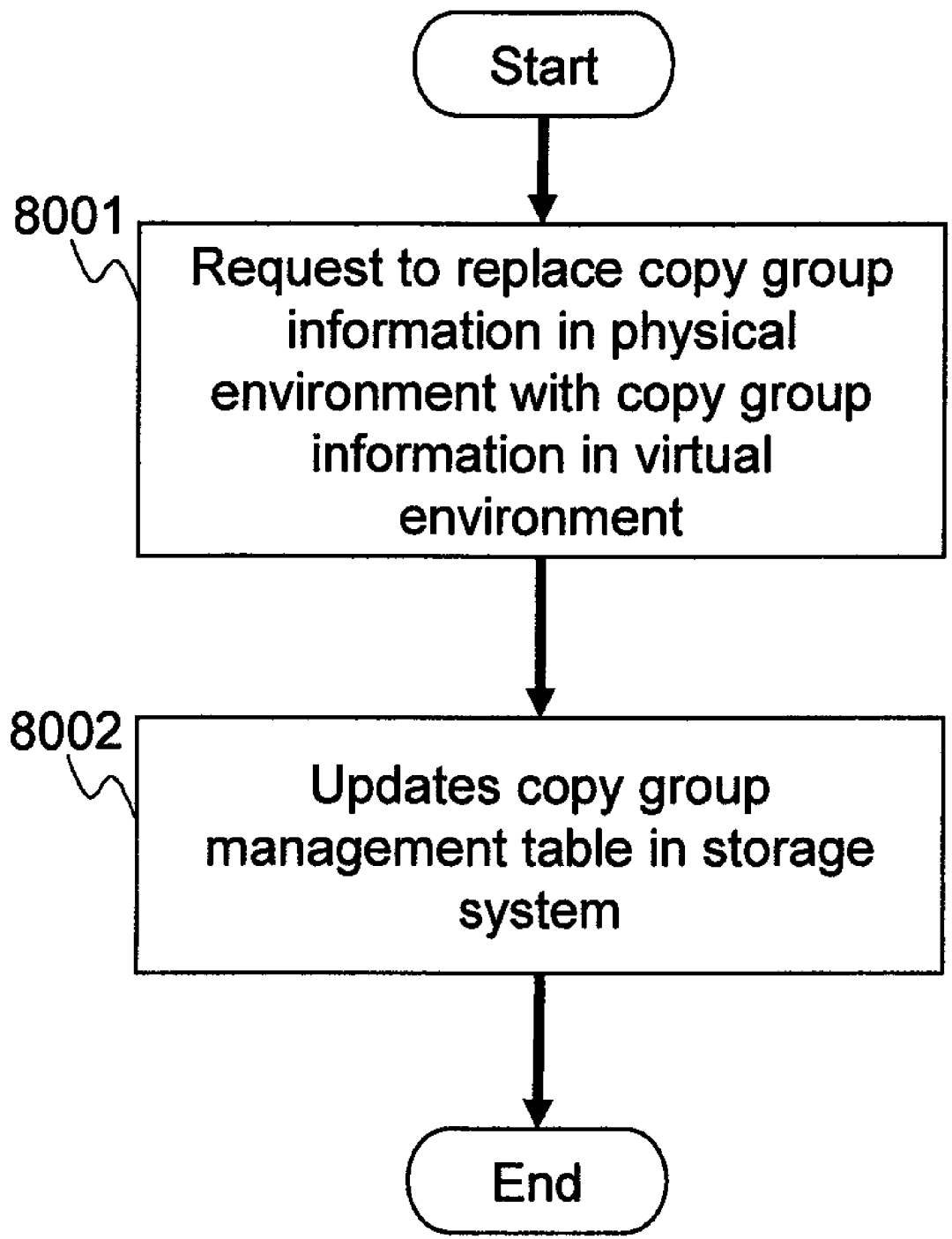
FIG. 14 shows an example of the process flow for migration of the copy group configuration executed with the migration program according to the first embodiment.

FIG. 14 shows an example of the process flow for migration of the copy group configuration executed with the migration program 652. The program sends a request to the storage system 100 to replace the copy group information in the physical environment with the copy group information in the virtual environment while keeping the same group ID (step 8001). Then, the pair management program 154 replaces the copy group information by updating the copy group management table 156 while keeping the same copy group ID and replacing the volume information (step 8002).

Figure 15:
FIG. 15 shows an example of the migration of the copy group configuration executed with the migration program according to the first embodiment.

FIG. 15 shows an example of migration of the copy group configuration executed with the migration program 652. The copy group management table 156*a* shows the configuration of the copy group "Grp_01" before migration while the copy group management table 156*b* shows the configuration of the copy group "Grp_01" after migration. This example shows that the copy group configuration of "Grp_01," which was originally comprised of volumes "00:01" and "00:02" for source and "01:01" and "01:02" for target, was replaced by new volumes "00:11" for source and "01:11" for target. Because the group ID is kept the same before and after migration, no change or attention is required in the backup operation.

Figure 16:
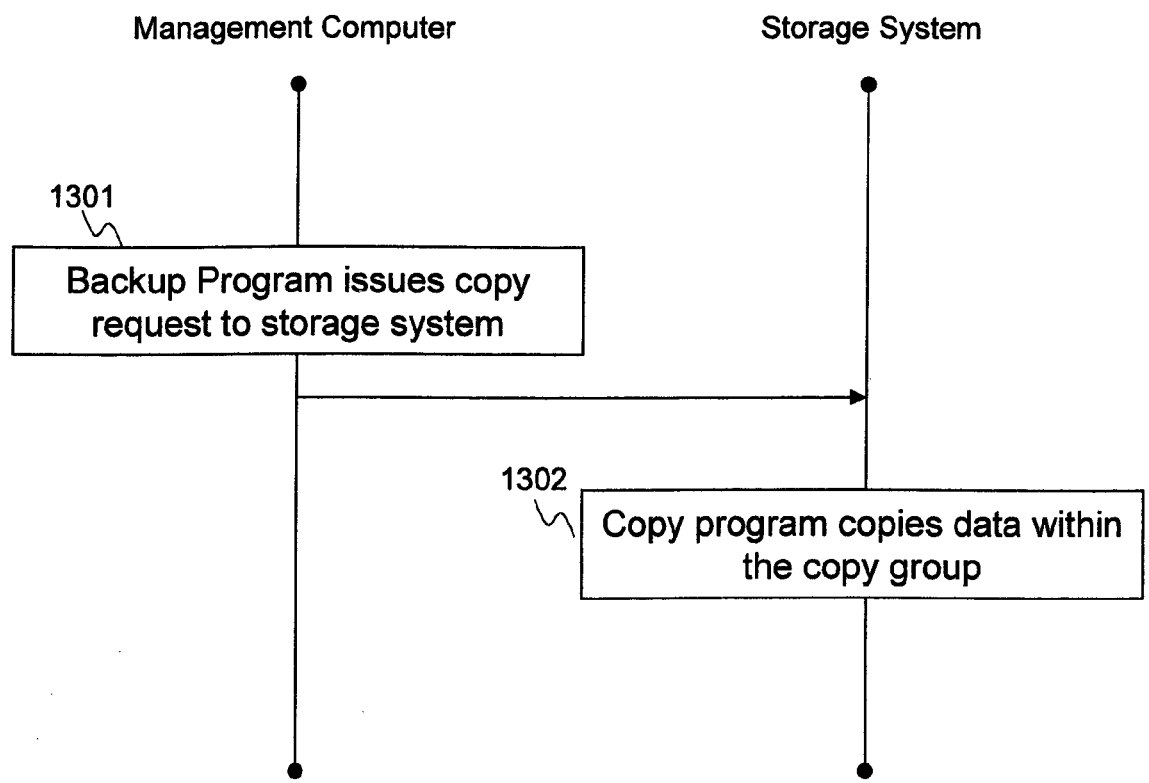
FIG. 16 shows an example of the backup operation flow executed with the backup program in the management computer.

FIG. 16 shows an example of the backup operation flow executed with the backup program 654 in the management computer 600. The backup program 654 issues a copy request to the storage system 100 based on the backup schedule defined in the backup management table 655 specifying group ID (step 1301). The data copy program 153 in the storage system 100 copies data within the specified copy group (step 1302). As the backup program 654 specifies the copy group in the backup process, administrators will be able to operate backup operations without change of the backup configuration even after the migration.

3. Management Window

Figure 17:
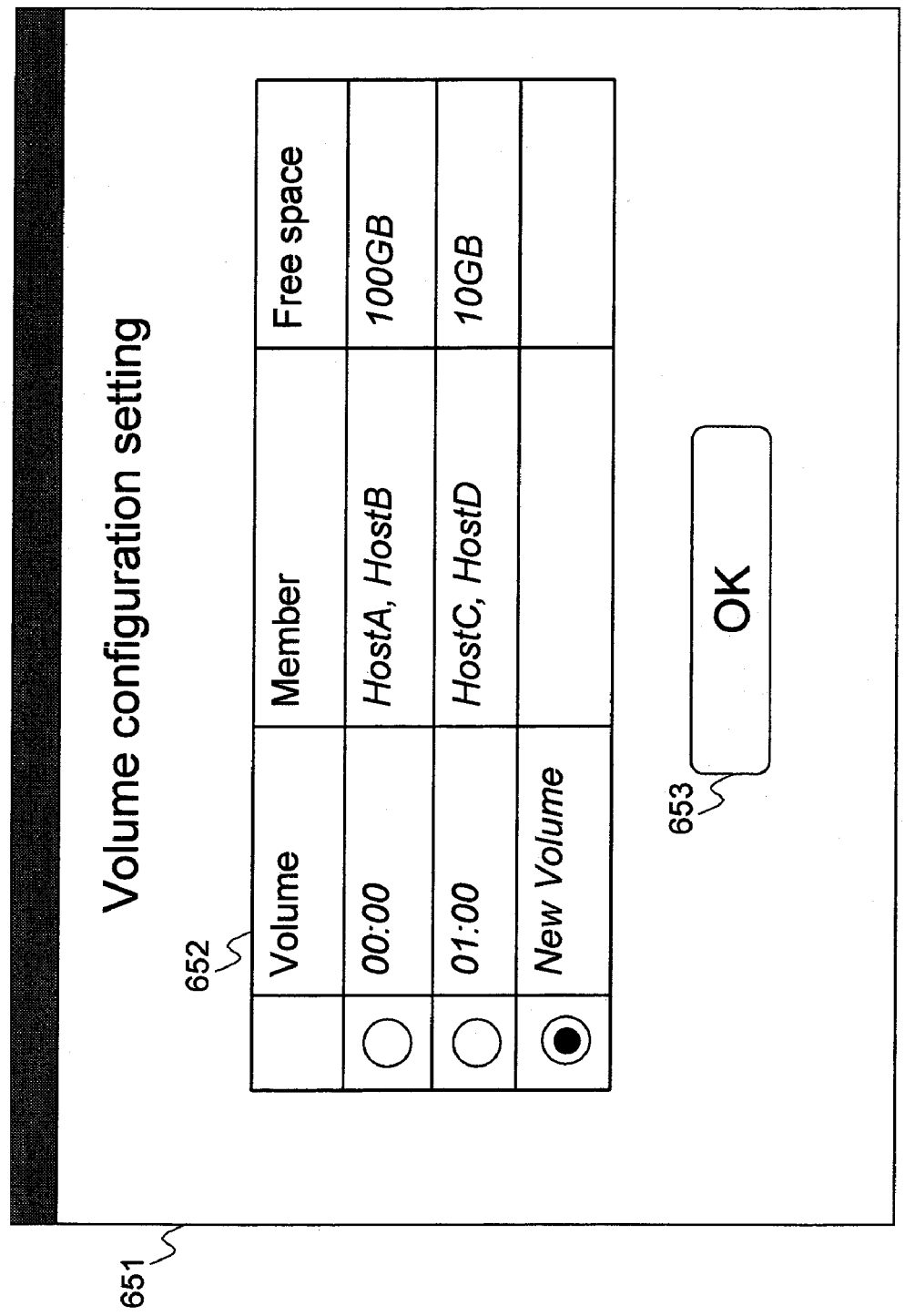
FIG. 17 shows an example of the management window to be displayed in the output device of the management computer to enable the administrator to input a request regarding how the VMs are allocated among the storage volumes.

FIG. 17 shows an example of the management window to be displayed in the output device 650 of the management computer 600 to enable the administrator to input a request regarding how the VMs are allocated among the storage volumes. The management window 651 has at least an area 652 that shows the selection of volumes with user-selection capability and a confirmation button 653. The administrator will be able to choose an existing volume or a new volume for a migration destination. This window can be shown before the volume capacity calculation step 2000 (FIG. 10), and the confirmation results are to be sent to the migration program 653.

Figure 18:
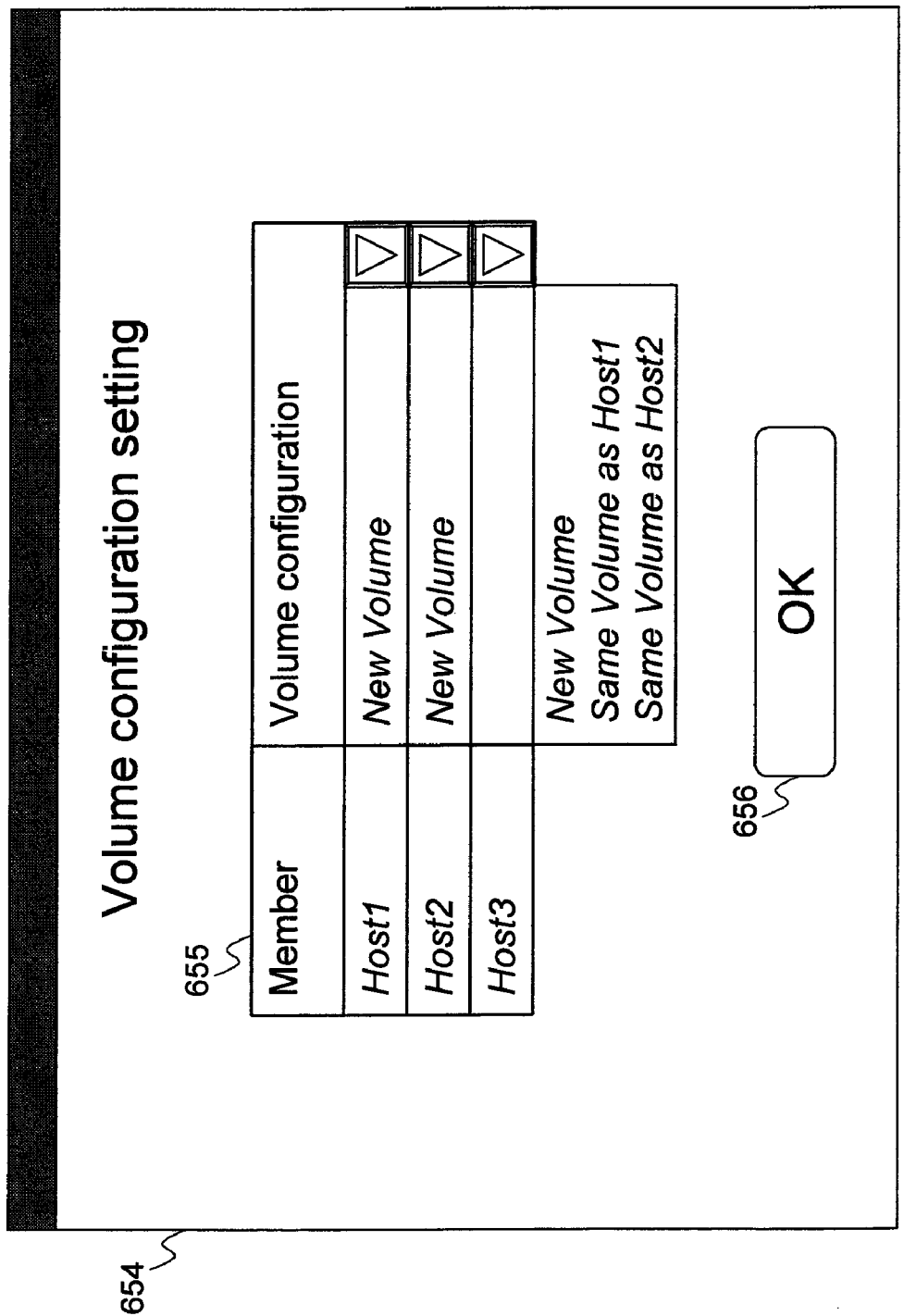
FIG. 18 shows an example of the management window to be displayed in the output device of the management computer to enable the administrator to input a request regarding how to allocate virtual a host among multiple volumes.

FIG. 18 shows an example of the management window to be displayed in the output device 650 of the management computer 600 to enable the administrator to input a request regarding how to allocate a virtual host among multiple volumes. The management window 654 has at least an area 655 that shows the selection of volume configuration with user-selection capability and a confirmation button 656. The administrator will be able to choose a "New Volume" or some other selection for a migration destination. If the administrator chooses "New Volume" for all hosts, it means that each virtual machine for each host is stored in a different volume. This window can be shown before the volume capacity calculation step 2000 (FIG. 10), and the confirmation results are to be sent to the migration program 653.

Second Embodiment

In the second embodiment, a computer system and a method in which the data and backup configuration in the storage system are migrated from the virtualized environment to the non-virtualized environment are described. When administrators migrate data in the storage system and backup configuration from the virtualized environment back to the non-virtualized environment, they need to redesign and reconfigure storage and backup configuration for the physical environment. Utilizing the second embodiment of this invention, administrators will be able to operate backup operations without change of the backup configuration even after the migration. The overall system configuration may be same as that in the first embodiment (FIG. 1).

Figure 19:
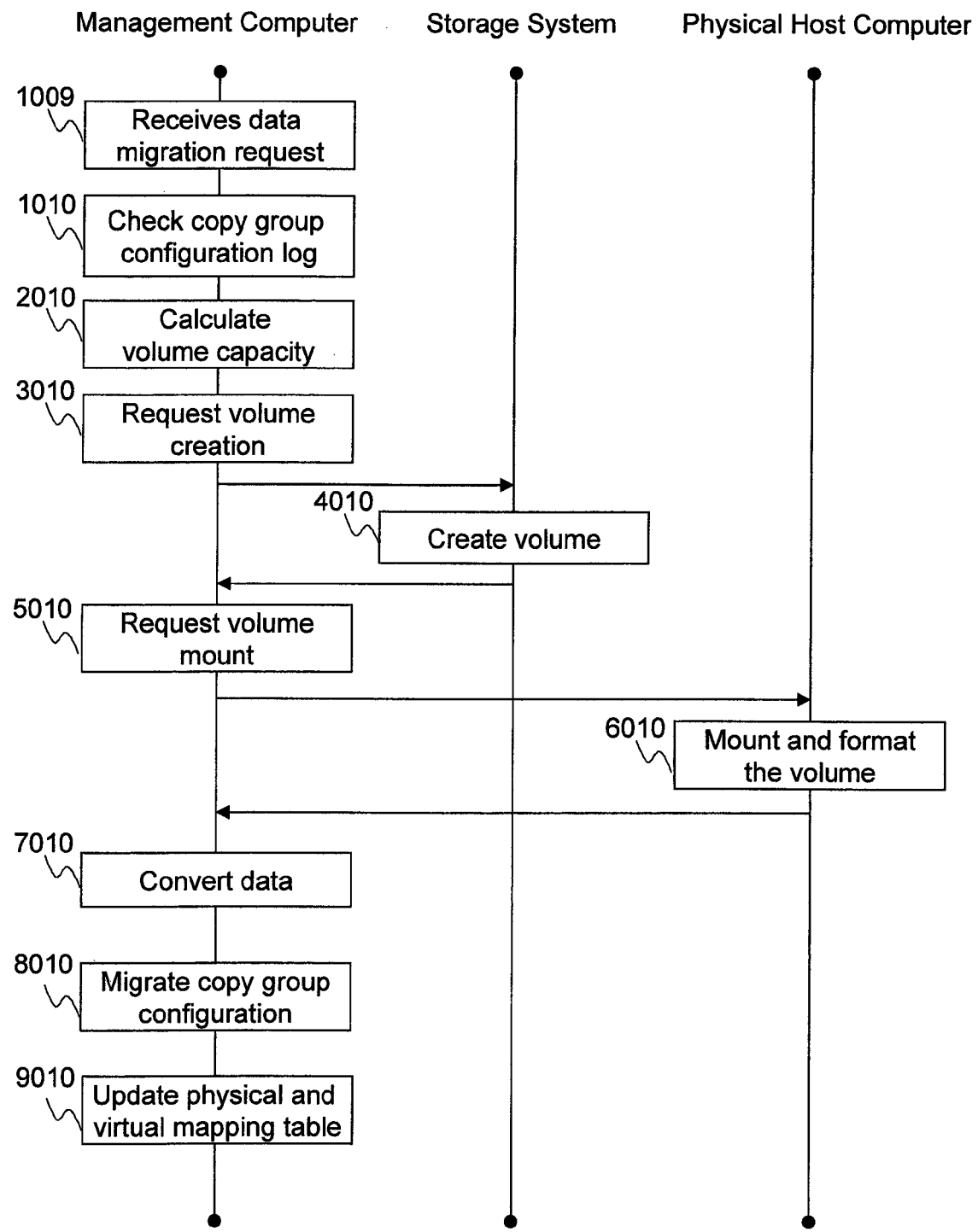
FIG. 19 shows an example of an overall process flow to migrate both data and backup configuration, from the virtual to the physical environment according to a second embodiment of the invention.

FIG. 19 shows an example of an overall process flow to migrate both data and backup configuration, from the virtual to the physical environment according to a second embodiment of the invention. The management computer 600 receives a migration request from an administrator (step 1009). The migration program 652 is executed and it checks the copy configuration regarding the copy group specified in the request by acquiring copy configuration information from the storage system 100 (step 1010). The migration program 652 calculates the necessary capacity as the migration target volumes with regard to all hosts in the subject copy group (step 2010). The capacity calculation process is explained below with FIG. 20. The migration program 652 sends a volume creation request to the storage system 100 based on the calculated capacity (step 3010).

The storage system 100 creates volumes with the requested capacity (step 4010). In this step, both source and target volumes may be created. The volume creation process is the same as that explained with FIG. 12. After receiving volume creation completion, the migration program 652 requests the physical host computer to mount the created volume (step 5010). The operating system in the physical host computer mounts and formats the specified volume (step 6010). The data conversion program 653 converts the virtual machine data to the physical environment data and stores the converted data in the created volume (step 7010). The data conversion process is the same as that explained with FIG. 13. Then, the pair management program 154 in the storage system 100 migrates the copy group configuration to the physical environment by updating the copy group management table 156 (step 8010). This process is explained below with FIG. 21.

The migration program 652 in the management computer updates the physical and virtual mapping table 656 (step 9010).

Figure 20:
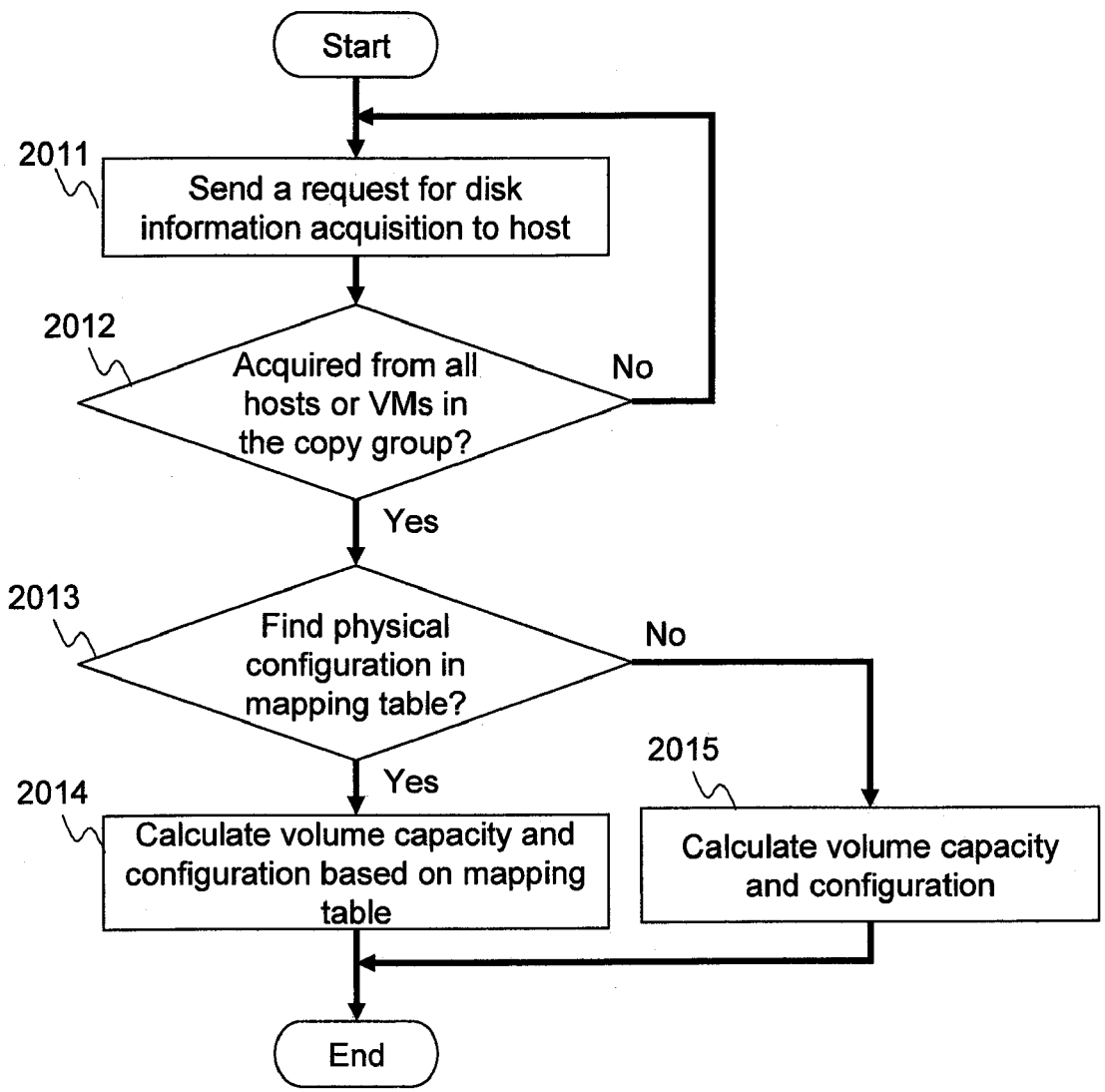
FIG. 20 shows an example of the process flow of capacity calculation executed with the migration program in the management computer according to the second embodiment.

FIG. 20 shows an example of the process flow of capacity calculation executed with the migration program 652 in the management computer 600 according to the second embodiment. The migration program 652 sends a disk information acquisition to the physical host computer 500a (step 2011). In this step, the disk management information including disk configuration and each capacity is acquired. If the migration program 652 has acquired from all virtual hosts computers or VMs in the copy group specified in the migration request (Yes at step 2012), it checks the physical and virtual mapping table 656. If there is a migration log for the hosts (Yes at step 2013), it determines the volume configuration based on the found configuration and calculates the capacity in any of the following ways (step 2014):

(1) Sum of intended disk capacity used by each host (VM);
(2) Result of (1), plus a certain margin for each volume;
(3) Result of (1), multiplied by a certain margin rate for each volume.

If there is not a migration log for the hosts or if the group configuration is inconsistent with current configuration (No at step 2013), it determines the volume configuration based on any of the following ways and calculates the volume capacity in any of the aforementioned ways (step 2015):

(1) One volume for each host including system (OS) and other partitions/disks;
(2) System partition/disk is to be stored in DAS (direct attached storage) and other data partitions are to be stored in volumes in the storage system.

If the migration program 652 has not acquired from all virtual host computers or VMs in the copy group (No at step 2012), it goes back to step 2011.

Figure 21:
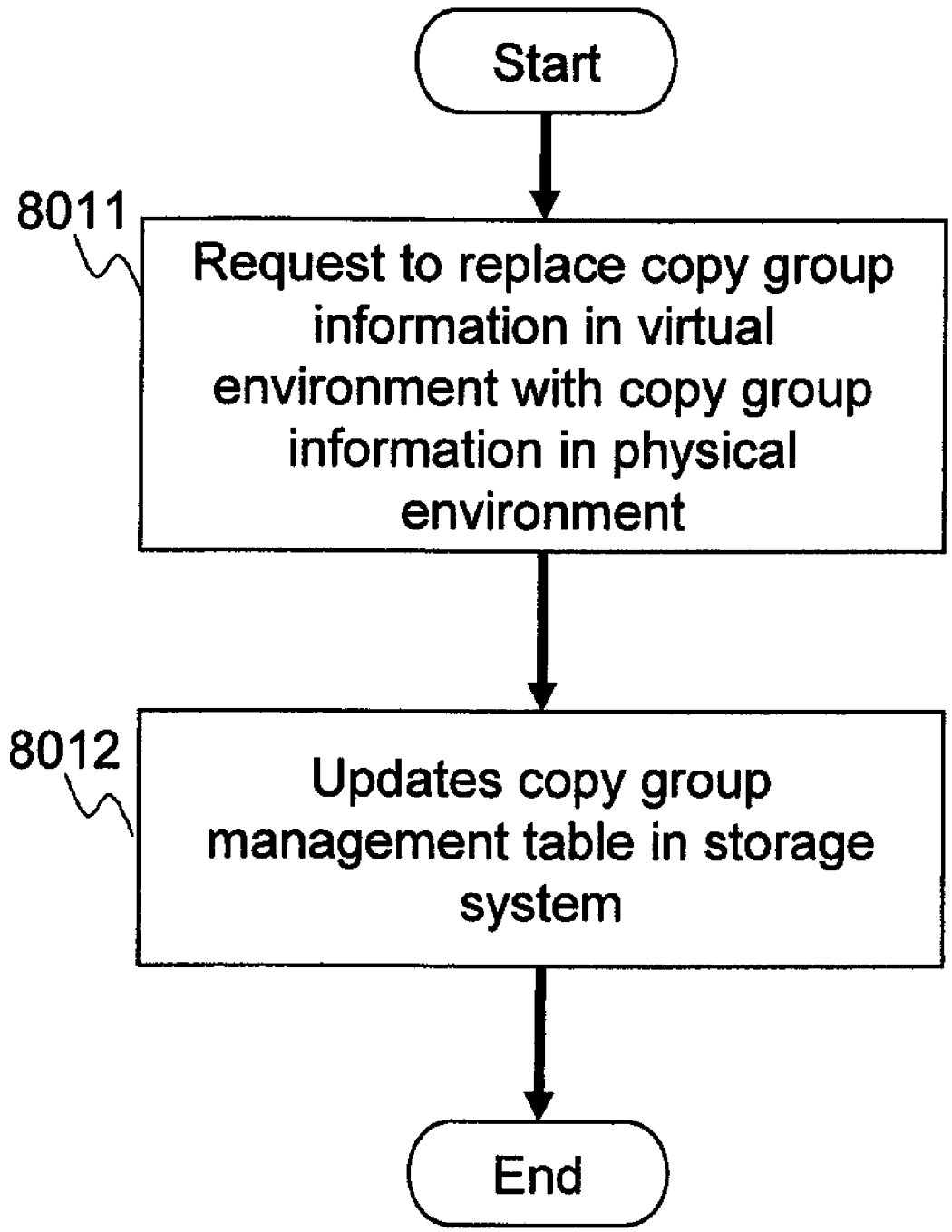
FIG. 21 shows an example of the process flow for migration of copy group configuration executed with the migration program according to second embodiment.

FIG. 21 shows an example of the process flow for the migration of copy group configuration executed with the migration program 652 according to the second embodiment. The program sends a request to the storage system 100 to replace the copy group information in the virtual environment with the copy group information in the physical environment while keeping the same group ID (step 8011). Then, the pair management program 154 replaces the copy group information by updating the copy group management table 156 while keeping the same copy group ID and replacing the volume information (step 8012).

Figure 22:
FIG. 22 shows an example of the migration of the copy group configuration executed with the migration program according to the second embodiment.

FIG. 22 shows an example of the migration of the copy group configuration executed with the migration program 652 according to the second embodiment. The copy group management table 156c shows the configuration of the copy group "Grp_01" before migration while the copy group management table 156d shows the configuration of the copy group "Grp_01" after migration. This example shows that the copy group configuration of "Grp_01," which was originally comprised of volumes "00:11" for source and "01:11" for target, was replaced by new volumes "00:01" and "00:02" for source and "01:01" and "01:02" for target. Because the group ID is kept the same before and after migration, no change or attention is required in the backup operation.

Figure 23:
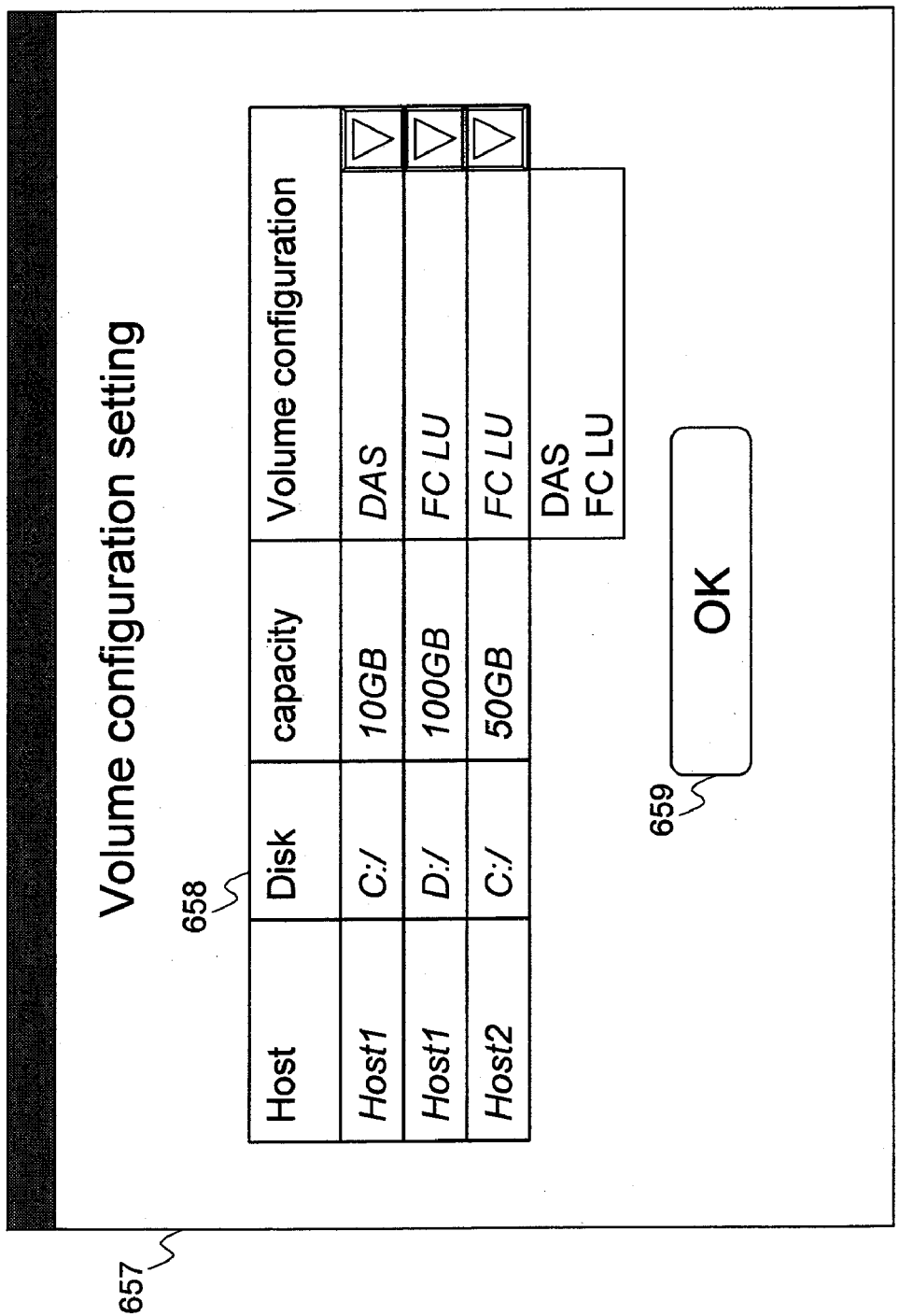
FIG. 23 shows an example of the management window to be displayed in the output device of the management computer to enable the administrator to input a request regarding how physical hosts are allocated.

FIG. 23 shows an example of the management window to be displayed in the output device 650 of the management computer 600 to enable the administrator to input a request regarding how physical hosts are allocated. The management window 657 has at least an area 658 that shows the selection of hosts, their disks, and capacity with user-selection capability of storage, and a confirmation button 659. The administrator will be able to choose the storage type such as direct attached storage (DAS) or FC LU for the migration destination. The invention is not limited to this example but any storage type supported in the system can be listed on this window. This window can be shown before the volume capacity calculation step 2010 (FIG. 19), and the confirmation results are to be sent to the migration program 652.

Of course, the system configurations illustrated in FIG. 1 is purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for migration of data and backup configuration between the virtualized system environment and the non-virtualized system environment. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A method of migrating a computer system between a virtualized environment and a non-virtualized environment, the method comprising:
configuring one or more storage volumes for a migration destination in a destination environment based on a migration request containing a backup requirement specifying one or more copy groups, each copy group including storage volumes that store data for at least one of a virtualized device and a non-virtualized device;
converting and migrating data from a migration source in a source environment to the one or more configured storage volumes of the migration destination based on copy group information of the one or more copy groups, one of the source environment and the destination environment being a virtualized environment, and another of the source environment and the destination environment being a non-virtualized environment; and
migrating backup unit/group information by replacing copy group information in the source environment with copy group information in the destination environment.

2. A method according to claim 1,
wherein the configuring comprises calculating a necessary capacity for the one or more storage volumes as one or more migration target volumes at the migration destination with regard to all devices at the migration source in each copy group specified in the migration request.

3. A method according to claim 2,
wherein the source environment is the non-virtualized environment and the destination environment is the virtualized environment; and
wherein the calculating comprises calculating a total capacity based on all non-virtualized devices at the migration source in each copy group to be used to create a new storage volume for a virtualized device at the migration destination.

4. A method according to claim 3,
wherein calculating the total capacity comprises calculating one of (1) sum of all disk capacities used for all non-virtualized devices in each copy group at the migration source; (2) sum of all disk capacities used for all non-virtualized devices in each copy group at the migration source plus a margin; (3) sum of all disk capacities used for all non-virtualized devices in each copy group at the migration source multiplied by a margin rate; or (4) sum of all disk capacities within an operating system multiplied by an operating system-specific capacity conversion ratio at the migration source.

5. A method according to claim 1,
wherein the source environment is the virtualized environment and the destination environment is the non-virtualized environment;
wherein each copy group has at least one of virtualized host devices or virtual machines as virtualized devices at the migration source;
wherein the configuring comprises:
obtaining disk information from all of the virtualized devices in each copy group at the migration source in the virtualized environment;
for each copy group, if there is a migration log for the virtualized devices in the copy group at the migration source, determining a volume configuration for the one or more migration target volumes at the migration destination based on a volume configuration in the migration log and calculating a total capacity based on all virtualized devices in the copy group at the migration source; and
for each copy group, if there is not a migration log for the virtualized devices at the migration source, determining a volume configuration for the one or more migration target volumes at the migration destination based on one of (1) one volume for each device in the copy group at the migration destination including an operating system and system partitions or disks, or (2) system partitions or disks to be stored in a direct-attached storage system and data partitions to be stored in volumes in the storage system at the migration destination, and calculating a total capacity based on all virtualized devices in the copy group at the migration source; and
wherein calculating a total capacity based on all virtualized devices in the copy group at the migration source comprises calculating one of (1) sum of an intended disk capacity used by each virtualized device in the copy group at the migration source; (2) sum of an intended disk capacity used by each virtualized device in the copy group at the migration source plus a margin for each migration target volume; or (3) sum of an intended disk capacity used by each virtualized device in the copy group at the migration source multiplied by a margin rate for each migration target volume.

6. A method according to claim 1,
wherein replacing copy group information in the source environment with copy group information in the destination environment includes keeping the same group identification for each copy group.

7. A system of migrating a computer system between a virtualized environment and a non-virtualized environment, the system comprising:
one or more virtualized devices in a virtualized environment;
one or more non-virtualized devices in a non-virtualized environment;
a storage system having a plurality of storage volumes;
a network connecting the one or more virtualized devices, the one or more non-virtualized devices, and the storage system; and
a migration module which configures one or more storage volumes at a migration destination in a destination environment based on a migration request containing a backup requirement specifying one or more copy groups, each copy group including storage volumes that store data for at least one of the virtualized device and the non-virtualized device; converts and migrates data from a migration source in a source environment to the one or more configured storage volumes of the migration destination; and migrates backup unit/group information by replacing copy group information in the source environment with copy group information in the destination environment;
wherein one of the source environment and the destination environment is the virtualized environment, and another of the source environment and the destination environment is the non-virtualized environment.

8. A system according to claim 7,
wherein configuring the one or more storage volumes at the migration destination comprises calculates a necessary capacity for the one or more storage volumes as one or more migration target volumes at the migration destination with regard to all devices at the migration source in each copy group specified in the migration request.

9. A system according to claim 8,
wherein the source environment is the non-virtualized environment and the destination environment is the virtualized environment; and
wherein calculating the necessary capacity for the one or more storage volumes comprises calculating a total capacity based on all non-virtualized devices at the migration source in each copy group to be used to create a new storage volume for a virtualized device at the migration destination.

10. A system according to claim 9,
wherein calculating the total capacity comprises calculating one of (1) sum of all disk capacities used for all non-virtualized devices in each copy group at the migration source; (2) sum of all disk capacities used for all non-virtualized devices in each copy group at the migration source plus a margin; (3) sum of all disk capacities used for all non-virtualized devices in each copy group at the migration source multiplied by a margin rate; or (4) sum of all disk capacities within an operating system multiplied by an operating system-specific capacity conversion ratio at the migration source.

11. A system according to claim 7,
wherein the source environment is the virtualized environment and the destination environment is the non-virtualized environment;
wherein each copy group has at least one of virtualized host devices or virtual machines as virtualized devices at the migration source;
wherein the one or more storage volumes at the migration destination comprises:
obtaining disk information from all of the virtualized devices in each copy group at the migration source in the virtualized environment;
for each copy group, if there is a migration log for the virtualized devices in the copy group at the migration source, determining a volume configuration for the one or more migration target volumes at the migration destination based on a volume configuration in the migration log and calculating a total capacity based on all virtualized devices in the copy group at the migration source; and
for each copy group, if there is not a migration log for the virtualized devices at the migration source, determining a volume configuration for the one or more migration target volumes at the migration destination based on one of (1) one volume for each device in the copy group at the migration destination including an operating system and system partitions or disks, or (2) system partitions or disks to be stored in a direct-attached storage system and data partitions to be stored in volumes in the storage system at the migration destination, and calculating a total capacity based on all virtualized devices in the copy group at the migration source; and
wherein calculating a total capacity based on all virtualized devices in the copy group at the migration source comprises calculating one of (1) sum of an intended disk capacity used by each virtualized device in the copy group at the migration source; (2) sum of an intended disk capacity used by each virtualized device in the copy group at the migration source plus a margin for each migration target volume; or (3) sum of an intended disk capacity used by each virtualized device in the copy group at the migration source multiplied by a margin rate for each migration target volume.

12. A system according to claim 7,
wherein replacing copy group information in the source environment with copy group information in the destination environment includes keeping the same group identification for each copy group.

13. A system according to claim 7, further comprising:
a management computer connected to the network;
wherein the migration module is in the management computer.

14. A system according to claim 7,
wherein the migration module is in one or more of the virtualized device or the non-virtualized device.

15. A computer-readable storage medium storing a plurality of instructions for controlling a data processor to migrate a computer system between a virtualized environment and a non-virtualized environment, the plurality of instructions comprising:
instructions that cause the data processor to configure one or more storage volumes for a migration destination in a destination environment based on a migration request containing a backup requirement specifying one or more copy groups, wherein each copy group includes storage volumes that store data for at least one of a virtualized device and a non-virtualized device;
instructions that cause the data process or to convert and migrate data from a migration source in a source environment to the one or more configured storage volumes of the migration destination, one of the source environment and the destination environment being a virtualized environment, and another of the source environment and the destination environment being a non-virtualized environment; and
instructions that cause the data processor to migrate backup unit/group information by replacing copy group information in the source environment with copy group information in the destination environment.

16. A computer-readable storage medium according to claim 15,
wherein the instructions that cause the data processor to configure the one or more storage volumes comprise instructions that cause the data processor to calculate a necessary capacity for the one or more storage volumes as one or more migration target volumes at the migration destination with regard to all devices at the migration source in each copy group specified in the migration request.

17. A computer-readable storage medium according to claim 16,
wherein the source environment is the non-virtualized environment and the destination environment is the virtualized environment; and
wherein the instructions that cause the data processor to calculate the necessary capacity comprise instructions that cause the data processor to calculate a total capacity based on all non-virtualized devices at the migration source in each copy group to be used to create a new storage volume for a virtualized device at the migration destination.

18. A computer-readable storage medium according to claim 17,
wherein the instructions that cause the data processor to calculate the total capacity comprise calculating one of (1) sum of all disk capacities used for all non-virtualized devices in each copy group at the migration source; (2) sum of all disk capacities used for all non-virtualized devices in each copy group at the migration source plus a margin; (3) sum of all disk capacities used for all non-virtualized devices in each copy group at the migration source multiplied by a margin rate; or (4) sum of all disk capacities within an operating system multiplied by an operating system-specific capacity conversion ratio at the migration source.

19. A computer-readable storage medium according to claim 15, wherein the source environment is the virtualized environment and the destination environment is the non-virtualized environment;

wherein each copy group has at least one of virtualized host devices or virtual machines as virtualized devices at the migration source;

wherein the instructions that cause the data processor to configure the one or more storage volumes comprise:

instructions that cause the data processor to obtain disk information from all of the virtualized devices in each copy group at the migration source in the virtualized environment;

for each copy group, if there is a migration log for the virtualized devices in the copy group at the migration source, instructions that cause the data processor to determine a volume configuration for the one or more migration target volumes at the migration destination based on a volume configuration in the migration log and calculate a total capacity based on all virtualized devices in the copy group at the migration source; and for each copy group, if there is not a migration log for the virtualized devices at the migration source, instructions that cause the data processor to determine a volume configuration for the one or more migration target volumes at the migration destination based on one of (1) one volume for each device in the copy group at the migration destination including an operating system and system partitions or disks, or (2) system partitions or disks to be stored in a direct-attached storage system and data partitions to be stored in volumes in the storage system at the migration destination, and calculate a total capacity based on all virtualized devices in the copy group at the migration source; and wherein calculating a total capacity based on all virtualized devices in the copy group at the migration source comprises calculating one of (1) sum of an intended disk capacity used by each virtualized device in the copy group at the migration source; (2) sum of an intended disk capacity used by each virtualized device in the copy group at the migration source plus a margin for each migration target volume; or (3) sum of an intended disk capacity used by each virtualized device in the copy group at the migration source multiplied by a margin rate for each migration target volume.

20. A computer-readable storage medium according to claim 15, wherein replacing copy group information in the source environment with copy group information in the destination environment includes keeping the same group identification for each copy group.

* * * * *